J. H. GREELEY.
ESCAPEMENT FOR CLOCKS AND WATCHES.
APPLICATION FILED OCT. 19, 1916.
1,232,285.
Patented July 3, 1917.
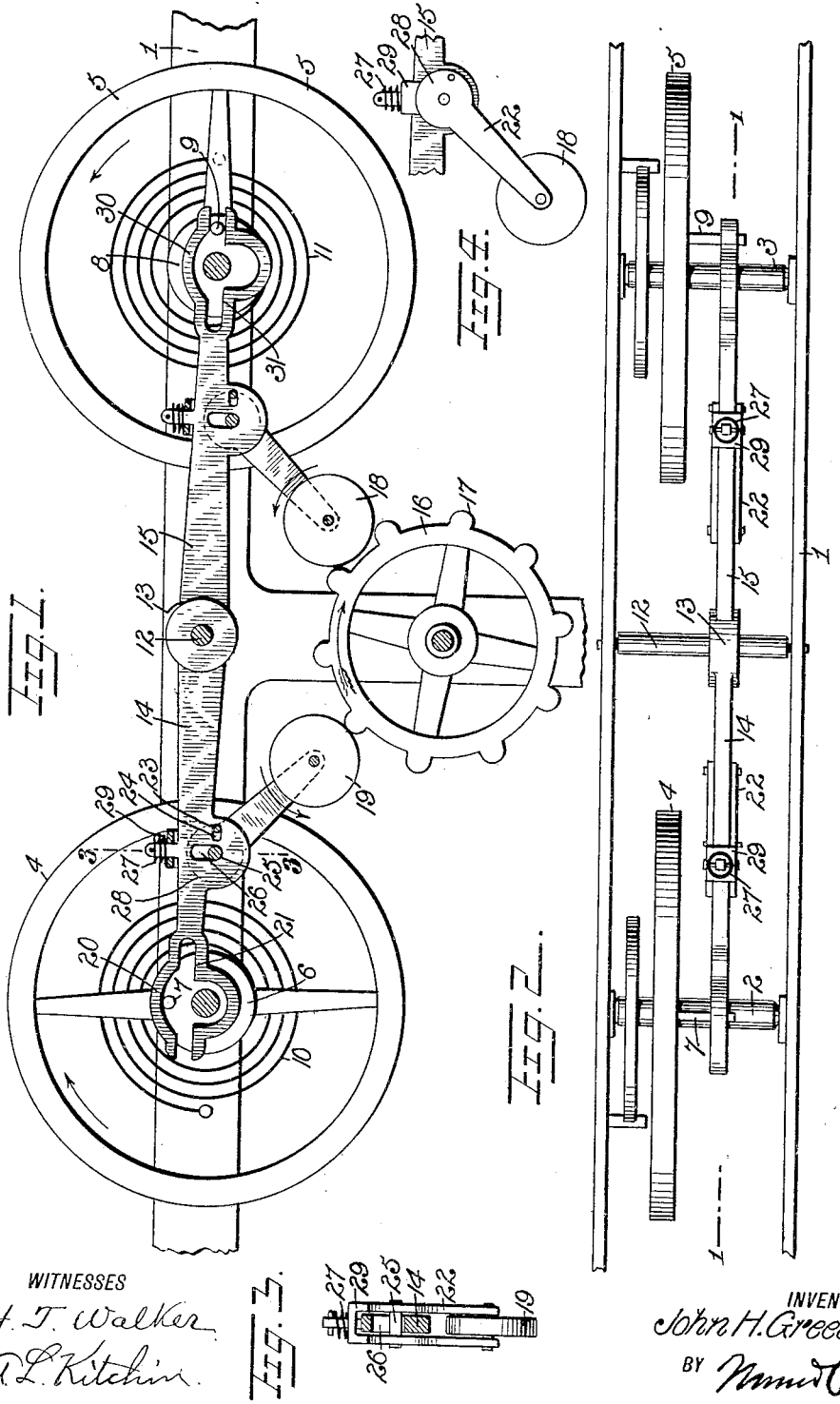
WITNESSES
H. T. Walker
A. L. Kitchin
INVENTOR
John H. Greeley
BY
ATTORNEYS

UNITED STATES PATENT OFFICE.

JOHN H. GREELEY, OF KEWANEE, ILLINOIS.

ESCAPEMENT FOR CLOCKS AND WATCHES.

1,232,285.      Specification of Letters Patent.      Patented July 3, 1917.

Application filed October 19, 1916. Serial No. 126,477.

*To all whom it may concern:*

Be it known that I, JOHN H. GREELEY, a citizen of the United States, and a resident of Kewanee, in the county of Henry and State of Illinois, have invented a new and Improved Escapement for Clocks and Watches, of which the following is a full, clear, and exact description.

This invention relates to escapements and has for an object the provision of an improved positively operating escapement capable of use in either watches or clocks.

Another object in view is to provide an escapement in which a pair of balance wheels are used in connection with a single escapement wheel in order to more evenly and accurately divide up the time of the movement of the escapement wheel.

A further object in view is to produce a spring balance wheel which is free and independent in its actions and positioned to act without the usual lever to force the same back and forth, the construction being such as to measure time while the levers associated therewith limit and regulate the action of the escapement wheel.

A still further object in view is to provide an escapement formed with a walking beam or central pivotally mounted lever and a pair of balance wheels associated with a single escapement wheel acting on the lever in such a manner that the escapement wheel is allowed an almost continuous movement.

In the accompanying drawing:

Figure 1 is a sectional view through Fig. 2 on line 1—1 of an escapement disclosing an embodiment of the invention, part of the supporting frame being broken away.

Fig. 2 is a top plan view of the escapement shown in Fig. 1.

Fig. 3 is a detail fragmentary sectional view through Fig. 1 on line 3—3.

Fig. 4 is a side view of one of the power rollers and associated parts.

Referring to the accompanying drawing by numerals, 1 indicates a supporting frame of any kind in which shafts 2 and 3 are journaled, said shafts being connected with the balance wheels 4 and 5. The balance wheel 4 is provided with a central plate 6 from which a crank pin 7 extends, while balance wheel 5 is provided with a central hub or plate 8 provided with a crank pin 9. Springs 10 and 11 are connected to the support 1 and to the hub or center of wheels 4 and 5 respectively, in any suitable manner, so as to provide for the back and forth motion of these wheels in the usual manner of balance wheels. The support 1 is also provided with a journal shaft 12 to which a walking beam or lever 13 is secured, said lever being provided with arms 14 and 15, arm 14 overlapping wheel 4 while arm 15 overlaps wheel 5. These arms are of identical construction and naturally work in opposition to each other so as to utilize the balance wheels 4 and 5, respectively. Arranged on part of the frame 1 is an escapement wheel 16 which is provided with rounded knobs 17, said escapement wheel being rotated as indicated by the arrows thereon. When the parts are in the position shown in Fig. 1 the roller 18 will prevent further rotation of the wheel 16 while roller 19 is resting on one of the knobs 17.

If the parts are in the position shown in Fig. 1 and the balance wheel 4 is rotating as shown by the arrow, the crank pin 7 connected with the balance wheel will move around until it strikes the lever 13 at point 21 and will depress and move downwardly arm 14 and raise arm 15, such movement being assisted by the pressure of one of the knobs 17 against roller 18. As the arm 14 moves downwardly the links 22 supporting roller 19 will be swung in the direction of the arrow adjacent said links and in a direction opposite to the direction of rotation of the escapement wheel 16. This swinging movement of the links 22 and roller 19 is caused by the fact that the pin 23 is connected with the links 22 and extends through a slot 24, said pin snugly fitting said slot but being sufficiently loose to allow a free sliding movement. As the arm 14 begins to move downwardly on the pivotal pin 12, pin 23 is held substantially fixed by reason of the fact that the roller 19 bears against one of the knobs 17, thus causing a pin 25 to move upwardly in the slot 26, the upper part of the slot moving downwardly to meet the pin. This movement produces a swinging action on the links 22 so that the roller 19 is swung away from the knob 17 on which it has been resting.

As these various movements take place a spring 27 is brought under tension by reason of the upward movement of the rounded sections 28 on links 22, which rounded sections support the U-shaped member 29. As soon as the roller 19 is free of the knob 17 spring 27 will act through member 29 for forcing the sections 28 downwardly and for swinging roller 19 back to its former position so as to catch the next knob and thus prevent a further rotation of the escapement wheel 16. While these movements are taking place the escapement wheel 16 has acted on roller 18 and forced the same upwardly at an angle and, consequently, has forced upwardly the arm 15, thus assisting the spring of the balance wheel 4. This upward movement of the arm 15 and associated parts gives the pin 7 a push so as to wind the spring of the wheel 4 and also raises the section 30 of arm 15 a sufficient distance to allow the crank pin 9 to perform substantially a one-half revolution and strike the section 31 of arm 15 in a similar manner to which the pin 7 strikes section 21 of arm 14. The striking of the pin 9 against section 31 and the remaining actions of the parts associated with pin 9 are similar to those on the opposite side of the pin 12 so will need no additional description. It will be noted, however, that the roller 18 swings in a direction opposite to the rotation of the escapement wheel 16. The rollers 18 and 19 are so arranged that one roller will be positioned between two knobs while the other is resting on top of one knob, the positions being reversed on each intermittent movement of the escapement wheel 16. As just stated, the escapement wheel moves intermittently but there is, by reason of the construction presented, an almost continuous movement of this wheel, as the stopping of the wheel is not absolutely complete but is regulated and limited by the action of the rollers 18 and 19, which rollers in turn are controlled by the parts connected therewith as heretofore described. When the balance wheels 4 and 5 have been started they will continue to operate and also the other mechanism will continue to operate as long as power is exerted on the escapement wheel 16 by the main spring or other source of power.

By the construction and arrangement specifically described it will be seen that a free balance wheel or, rather, a pair of free balance wheels are utilized. One of the spring balance wheels is arranged to come into contact with the lever 13 and instantly release the other spring balance wheel whereby said other wheel may freely and independently measure time while the first balance wheel is being wound and set, which will in turn be released to measure time when the latter wheel has run its course and come into contact with the lever. The two balance wheels, of course, occupy time in which to perform their functions and this time necessary is necessarily a correct measurement of time for controlling the release of the escapement wheel 16. By the use of the lever 13 and rollers 18 and 19 and associated parts, these two balance wheels give a proper measurement of time without the use of the usual arm for propelling a wheel as commonly practised.

What I claim is:

1. In an escapement mechanism of the character described, an escapement wheel provided with rounded knobs spaced apart, a pair of rollers coacting with said knobs for regulating the rotary movement of the escapement wheel, a pivotally mounted member supporting each of said rollers, a pivotally mounted lever supporting said members, and a balance wheel near each end of said lever for operating the lever, said balance wheels coacting with the escapement wheel and the knobs thereon.

2. An escapement mechanism of the character described, comprising an escapement wheel provided with spaced knobs, a pair of rollers coacting with said knobs, one of said rollers being arranged between two knobs while the other is arranged on top of one of the knobs during the stationary period of the escapement wheel, a pivotally mounted lever, a pair of slots adjacent each end of said lever, a pin extending through each of said slots, a link connecting each of said rollers with two of said pins, said slots being arranged so that said rollers may be swung in a direction opposite to the direction of rotation of the escapement wheel, and balance wheels acting on the ends of said lever for giving the same an initial movement whereby the roller on said knobs will be swung therefrom and the roller between the other knobs will be moved radially away from the escapement wheel.

3. In an escapement mechanism of the character described, a lever, means for pivotally mounting said lever centrally, said lever having slots in the ends and an arc-shaped portion at each end, a balance wheel for each end of said lever, a crank pin connected with each of said balance wheels and operating in said slots whereby the crank is caused to strike the lever for starting the movement thereof in each new direction, a pair of links, means for pivotally connecting said links with said lever, means for limiting the pivotal movement of said links in one direction, a roller arranged at the outer end of each of said links, and an escapement wheel formed with knobs coacting with said rollers.

4. In an escapement mechanism of the character described, a pivotally mounted lever, balance wheels arranged at each end of said lever for starting a pivotal movement on each change of direction, a pair of identically arranged links pivotally connected with said lever, a spring continually tending to hold said links in a given position, means for causing said links to be swung to one side when said lever is moved, a roller arranged on the outer end of each of said links, and an escapement wheel provided with knobs coacting with said rollers.

5. In an escapement mechanism of the character described, a lever, means for pivotally mounting said lever centrally, said lever having openings at each end, a balance wheel at each end of said lever provided with a crank pin extending into the respective openings whereby said pin may give the initial movement to said lever in changing direction, a pair of links connected to said lever near the ends thereof, each of said links carrying a pair of pins, said lever being provided with a transversely arranged aperture near one of said pins and a longitudinally arranged aperture near the other of said pins whereby said links may be moved pivotally in a direction opposite to the direction of rotation of the escapement wheel, a spring for each of said links for returning the same to their former position when moved therefrom, a roller arranged adjacent the outer end of each of said links, an escapement wheel, and knobs coacting with said rollers for giving the rollers a push alternately, which push is communicated to said lever through said links.

JOHN H. GREELEY.

Copies of this patent may be obtained for five cents each, by addressing the "Commissioner of Patents, Washington, D. C."